United States Patent [19]

Van Driel et al.

[11] Patent Number: 5,014,277

[45] Date of Patent: May 7, 1991

[54] LASER MODE-COUPLING VIA A PULSED MODULATOR

[76] Inventors: Henry M. Van Driel, Clarksville Ct., Mississauga, Ontario, Canada, L5A 1G8; Giampiero Giuliani, Via Padova, 65, Rome, Italy, 00165

[21] Appl. No.: 361,645

[22] Filed: Jun. 5, 1989

[30] Foreign Application Priority Data

Apr. 21, 1989 [CA] Canada ................................. 597439

[51] Int. Cl.[5] .............................................. H01S 3/098
[52] U.S. Cl. ........................................ 372/18; 372/12; 372/25
[58] Field of Search ....................... 372/12, 18, 20, 32

[56] References Cited

U.S. PATENT DOCUMENTS

| | | | |
|---|---|---|---|
| 3,809,680 | 3/1975 | Fletcher et al. | 372/18 |
| 4,176,327 | 11/1979 | Wayne et al. | 372/12 |
| 4,181,899 | 1/1980 | Liu | 372/32 |
| 4,314,210 | 2/1982 | Everett | 372/18 |
| 4,660,205 | 4/1987 | Harter et al. | 372/18 |
| 4,660,206 | 4/1987 | Halmos et al. | 372/28 |
| 4,868,834 | 9/1989 | Fox et al. | 372/20 |

FOREIGN PATENT DOCUMENTS 988620 5/1976 Canada .
1180797 1/1985 Canada .

OTHER PUBLICATIONS

J. D. Kafka and T. Baer, "Mode-Locked Erbium-Doped Fiber Laser with Soliton Pulse Shaping" Nov. 15/89 vol. 14, No. 22, Optics Letters, pp. 1269-1271.
"A Stabilized Mode-Locked Nd:YAG Laser Source", IEEE J. Quantum Electronics, Jun. 1969-pp. 326-327-T. S. Kinsel, et al.
"Electrooptic Light Modulators", I. P. Kaminow and E. H. Turner 1612 Applied Optics/vol. 5, No. 10, Oct. 1966.
"Mode-Locking of CW Lasers by Regenerative RF Feedback"-vol. 13, No. 5, Applied Physics Letters, G. R. Huggrett, Sep. 1, 1968-pp. 186-187.
Shifting or Stabilizing Laser Frequency with e-o Modulator in or Outside Cavity (In Laser Focus (U.S.A.)), Anafi et al., Laser Focus(U.S.A.), vol. 13, No. 8, pp. 72-5, Aug. 1977.
Mode-Locked Argon Laser with Intracavity Radiation Extraction (In Prib. & Tekh. Eksp. (USSR)), Bakinovskii, et al, vol. 26, pp. 159-162, May-Jun. 1983.
"Stable Argon Laser with Phase Mode Locking", Kuzmin, et al.
"Instabilities in a CO/sub 2/Laser with Feedback on Intracavity E-O Modulator", Gadomski, et al.
"Q-Switching, Mode-Locking and Tunable Operation Around 0.9 mu m of a Neodymium-Doped Monomode Fibre Laser", Alcock, et al.
"Polarization Bistability in External Cavity Semiconductor Lasers", Fujita, et al.
"Device for Simultaneous Multiple-Line Mode Locking of an Argon-Ion Laser", T. Kitahara.
"Active Laser Mode Coupling", A. Siegwan's "lasers", University "Active Laser Mode coupling", A. Siegwan's "Lasers", University Science, (1987) pp. 1041-1075.

Primary Examiner—Frank Gonzalez
Attorney, Agent, or Firm—Riches, McKenzie & Herbert

[57] ABSTRACT

A laser system wherein a pulsed switching signal is applied to the modulator to provide a mode-coupled output beam having spaced short pulses. The synchronized pulsed switching signal can be provided by an external driver and or by feedback from the laser beam.

14 Claims, 4 Drawing Sheets

LASER MODE-COUPLING VIA A PULSED MODULATOR

BACKGROUND OF THE INVENTION

This invention relates generally to lasers and more particularly to a mode-coupled laser system wherein the laser beam is mode-coupled by means of a pulsed switching signal having spaced short pulses.

For clarification, reference herein to the pulsed output beam and switching signal having "spaced short pulses" indicates the width of the spaced pulses is considerably shorter than the cavity round trip time and is not a sinusoidal modulation signal.

As is well known, the period T of the output signal from a standing-wave laser cavity of length L is, $$T = \frac{2L}{C}$$

A pulsed periodic laser output signal has a set of frequency sidebands or axial modes which are to some degree coupled in phase. It is desirable to produce mode-coupled laser signals or beams having short pulsewidths for various scientific and industrial uses as it provides improved time resolution higher peak intensity.

Active and passive mode coupling of pulsed laser output signals are well known. Active mode coupling has usually been achieved by driving a modulator located in the laser cavity with a sinusoidal electrical modulation signal having a frequency which is closely tuned to the round-trip frequency of the laser cavity to cause the formation of pulses. Sinusoidal modulation produces relatively long laser pulses because of the inherently long switching signal. Theoretical analysis based on gaussian-pulse approximation shows that the laser pulsewidth is directly proportional to the square root of the switcing pulsewidth and inversely proportional to the fourth root of the switching pulse amplitude. Passive mode coupling has been achieved by locating a saturable absorber element in the laser cavity which has an absorption depending on the optical intensity. This has produced shorter pulsewidths than those achievable by active mode coupling because of the shorter pulsewidth switching signal provided by the non linear saturable absorber. While passive mode coupling achieves shorter pulsewidths, it has the disadvantages that it does not allow any external synchronization, reduces efficiency of the laser, and is chemically degradable.

Active mode locking is known using feedback of the fundamental cavity frequency from the output laser beam to drive the modulator via an amplifier to ensure frequency locking of the modulation frequency with the round-trip frequency of the laser cavity Such an arrangement is described by T. S. Kinsel et al in "A Stabilized Mode-Locked Nd:YAG Laser Source", IEEE J. Quantum Electronics, June 1969. However, this method still uses a sinusoidal modulation signal and does not produce a shorter output pulsed signal.

SUMMARY OF THE INVENTION

Accordingly, it is an object of the present invention to at least partially overcome the disadvantages of the prior art by providing a low power compact modulator driven by short spaced pulses and capable of producing an output laser beam having short pulses than those achievable using a sinusoidal modulation signal.

To this end, in one of its aspects, the invention provides a laser system comprising an optical resonant cavity, means including a laser gain medium, means for pumping the laser gain medium located in the cavity for producing a beam circulating in the cavity with a cavity round trip time, modulator means located in the cavity, and laser light output means to provide a portion of said circulating beams as a laser output beam and pulse generator means connected to the modulator means to provide a pulsed electrical switching signal having spaced short pulses which cause mode coupling of the circulating beam to produce said laser output beam having spaced short pulses with a period equal to the round trip time of the cavity, the width of the spaced pulses of the mode-coupled output beam and the switching signal being considerably shorter than the cavity round trip time.

DETAILED DESCRIPTION OF THE DRAWINGS

Figure 1:
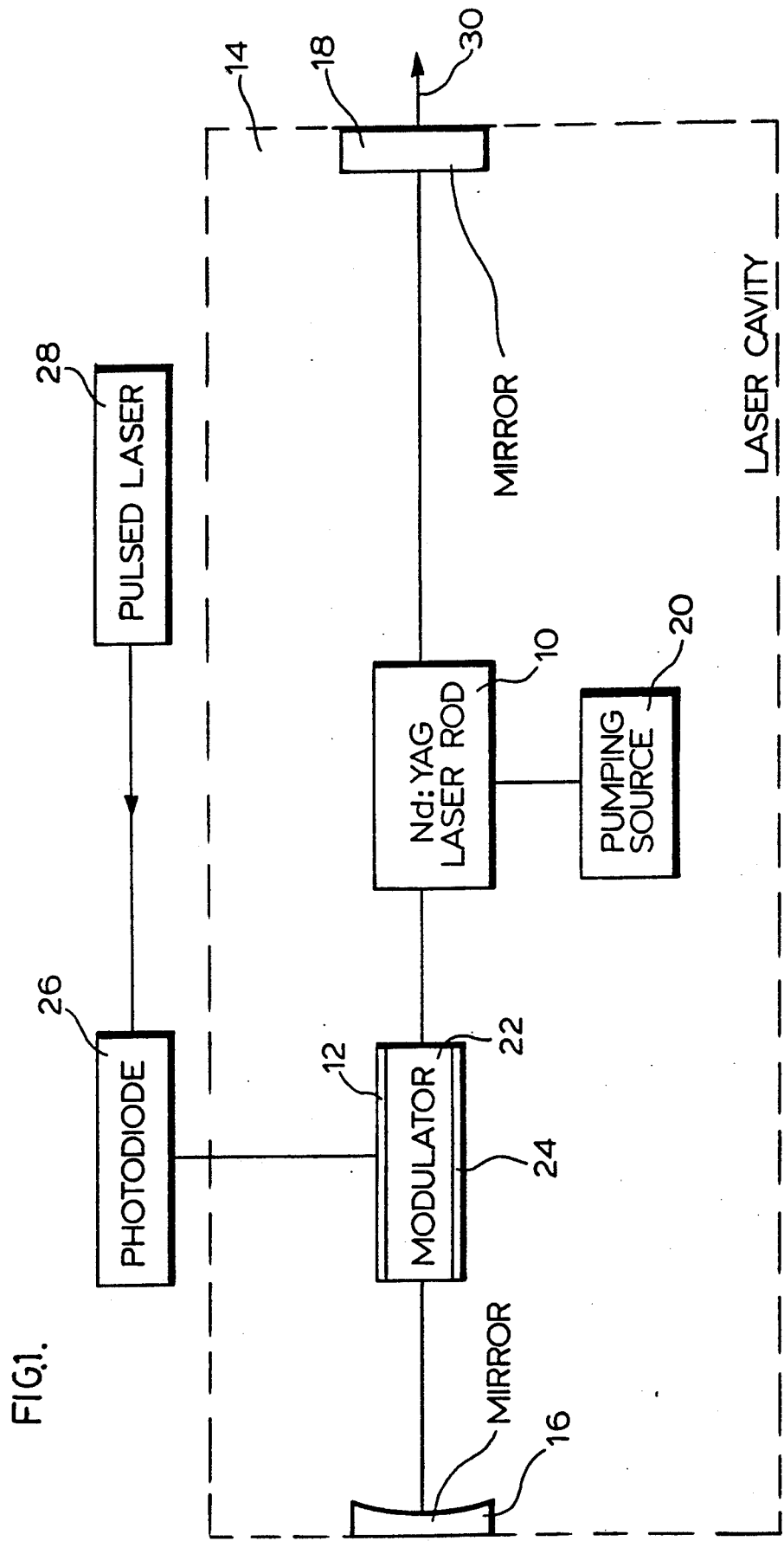
FIG. 1 is a block diagram showing a modecoupled laser system according to a first embodiment of the invention.

Reference is first made to FIG. 1 which schematically illustrates a laser system having a Nd:YAG laser rod 10 (yttrium aluminum garnet doped with neodymium ions) and a modulator 12 aligned in a laser cavity 14 between a mirror 16 and a partially transmitting output mirror or coupler 18. While the laser gain medium in this embodiment is an Nd:YAG rod 10, it will be apparent that a variety of other materials can be used instead. In this embodiment, the laser gain medium 10 is pumped by a continuous wave dye laser 20 having a wavelength of $\approx 0.59$ $\mu$m. However, other pumping sources can be used. The modulator 12 is a LiTaO$_3$ crystal 22 with a microstrip waveguide 24 matched into 50 $\Omega$. The modulator 12 has a DC, $\lambda/2$ field of 240 v/cm at $\lambda = 1.06$ $\mu$m. Other modulators which will accept a short pulsed switching signal having spaced short pulses can be used.

The modulator 12 is driven by a pulsed electrical switching signal having spaced short pulses received from a photodiode detector 26 mounted outside the laser cavity 14 and connected to the modulator 12. In this embodiment, the photodiode detector 26 is formed of indium gallium arsenide phosphide (InGaAsP), although other suitable materials can be used. The photodiode detector 26 in turn, receives a pulsed light signal from a pulsed laser 28 to produce the pulsed switching signal. In other embodiments of the invention, the photodiode detector 26 can be replaced by a different photodetector or both the photodiode detector 26 and the pulsed laser 28 can be replaced by a different voltage pulse generator which produces a suitable pulsed electrical switching signal having spaced short pulses. In another embodiment, this system can include a supplementary external driver connected to the modulator 12.

Figure 2A:
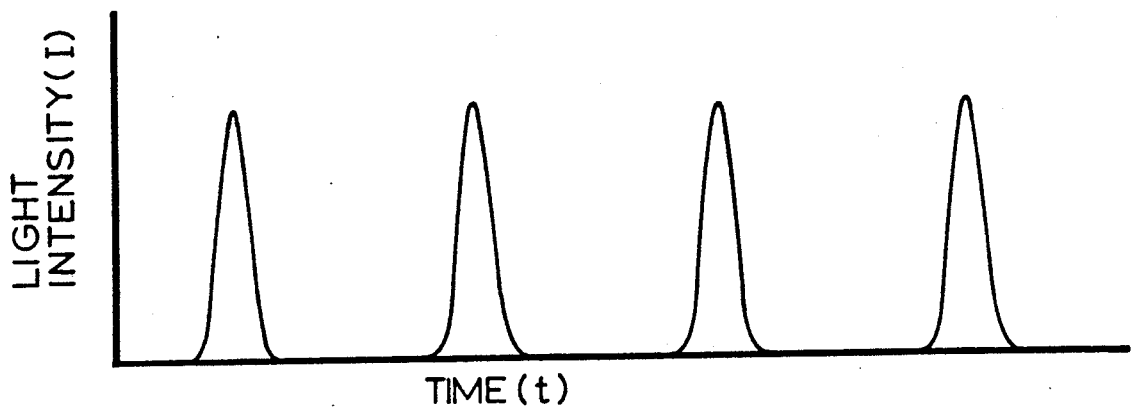
FIGS. 2a, 2b and 2c illustrate the pulsed signal at several points in the system shown in FIG. 1.
Figure 2B:
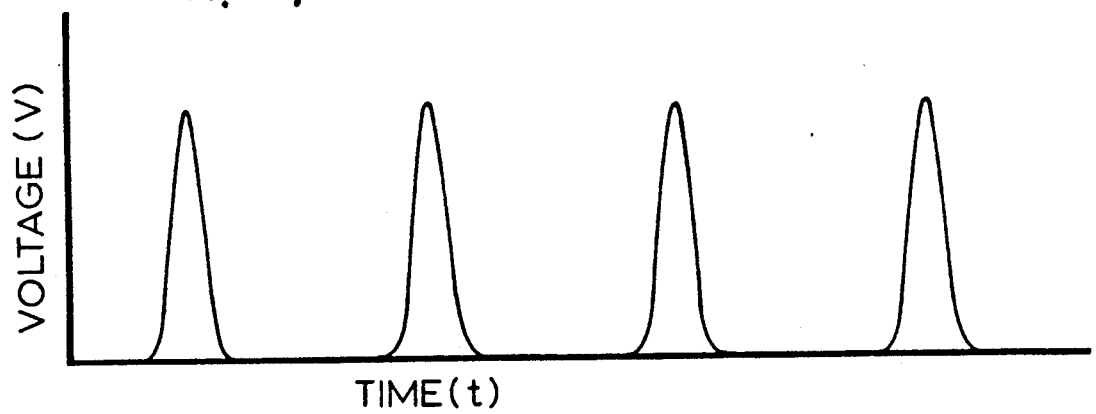
Figure 2C:
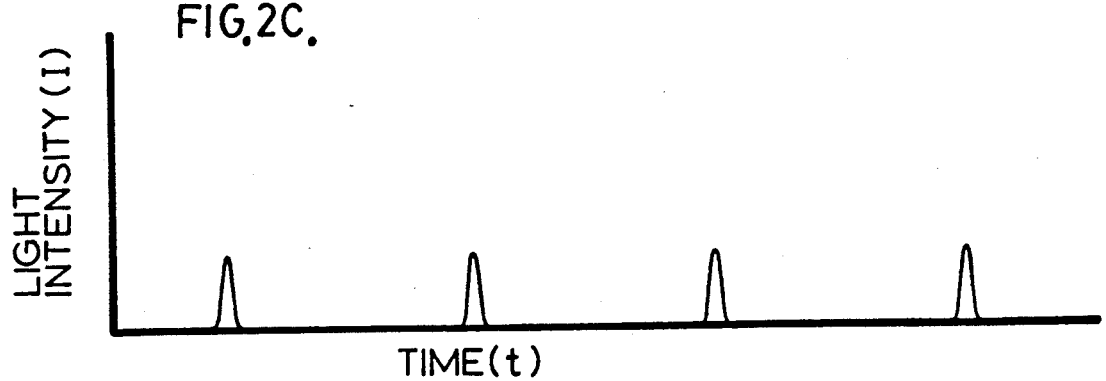

In use, the pumped Nd:YAG laser rod 10 in the cavity 14 produces a laser output signal or beam 30 through the output mirror 18. The pulsed laser 28 directs a periodic pulsed light signal as shown in FIG. 2a at the photodiode detector 26. This causes the photodiode detector 26 to produce a pulsed electrical switching signal as shown in FIG. 2b which has spaced short pulses to drive the modulator 12. The repetition rate of the pulsed switching signal is selected to equal the round-trip time of the laser cavity 14. It has been found that the output beam 30 produced using this pulsed switching signal also has spaced short pulses with pulsewidths considerably shorter than the cavity round trip time, as shown in FIG. 2c. The laser output pulses have pulses shorter than those achievable by using a sinusoidal signal to drive the modulator, and in fact are much shorter than shown for ease of illustration in FIG. 2c.

Figure 3:
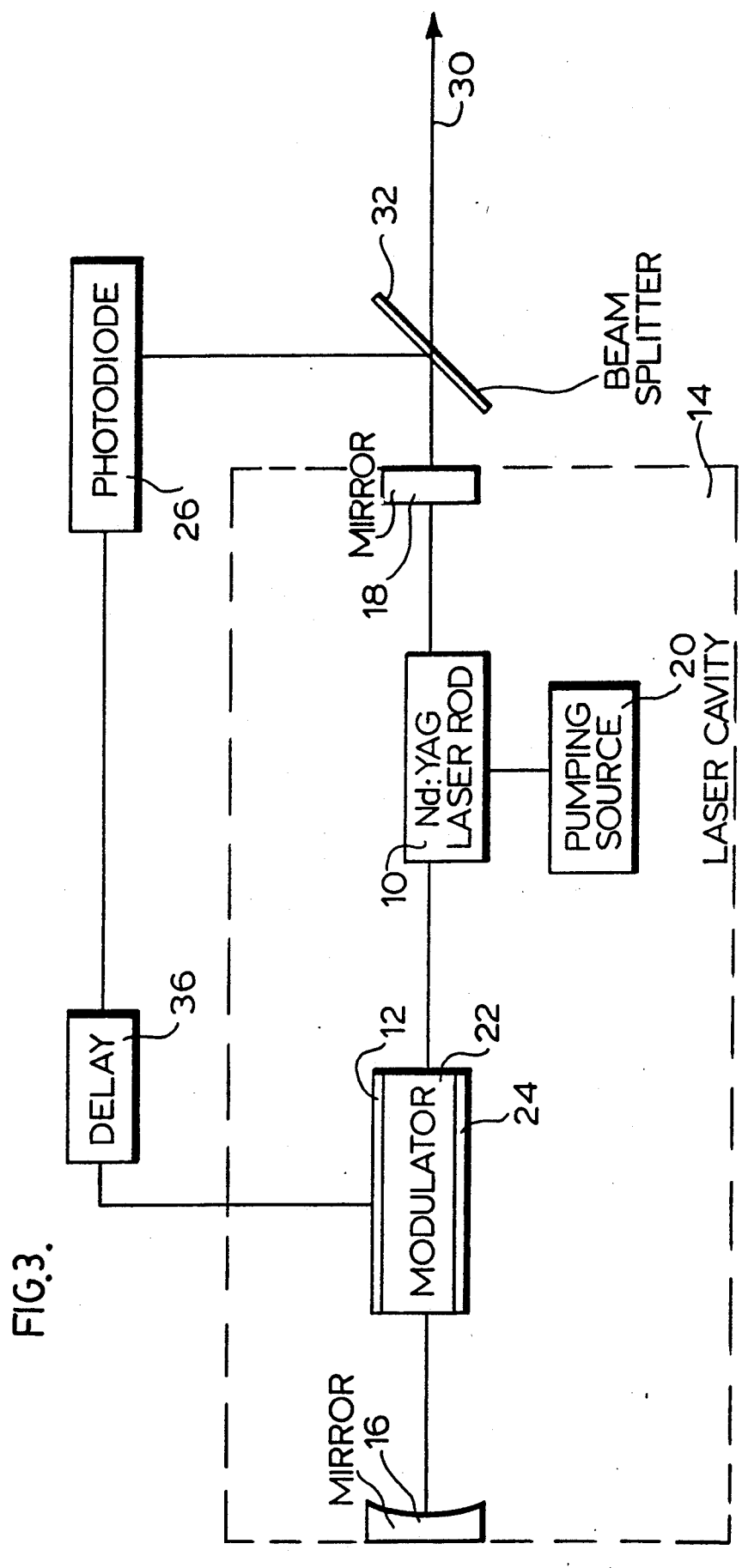
FIG. 3 shows a laser system according to a second embodiment of the invention wherein the pulsed switching signal is partially or totally provided by a portion of the laser output.

FIG. 3 shows a laser system according to a second embodiment of the invention. As many of the elements of this embodiment are identical to those of the first embodiment described above, elements common to both embodiments are described and illustrated using the same reference numerals. In this embodiment, the laser rod 10, modulator 12, mirrors 16,18 and pumping source 20 in the cavity 14 are all identical to those described above. However, in this embodiment, the pulsed switching signal to the modulator 12 is provided by feedback from the output laser beam 30. An optical beam splitter 32 is mounted in the path of the output beam 30 to deflect a portion of the output beam 30 to a photodiode detector 26 which is connected to the modulator 12 through an adjustable delay line 36. The photodiode detector 26 produces a pulsed electrical switching signal having spaced short pulses which drives the modulator 12. Delay of the switching signal can be controlled by the adjustable delay line 36 to ensure that the switching signal is in phase with the laser output beam 30 which has spaced short pulses. In another embodiment, this system can include a supplementary external driver connected to the modulator 12.

Figure 4:
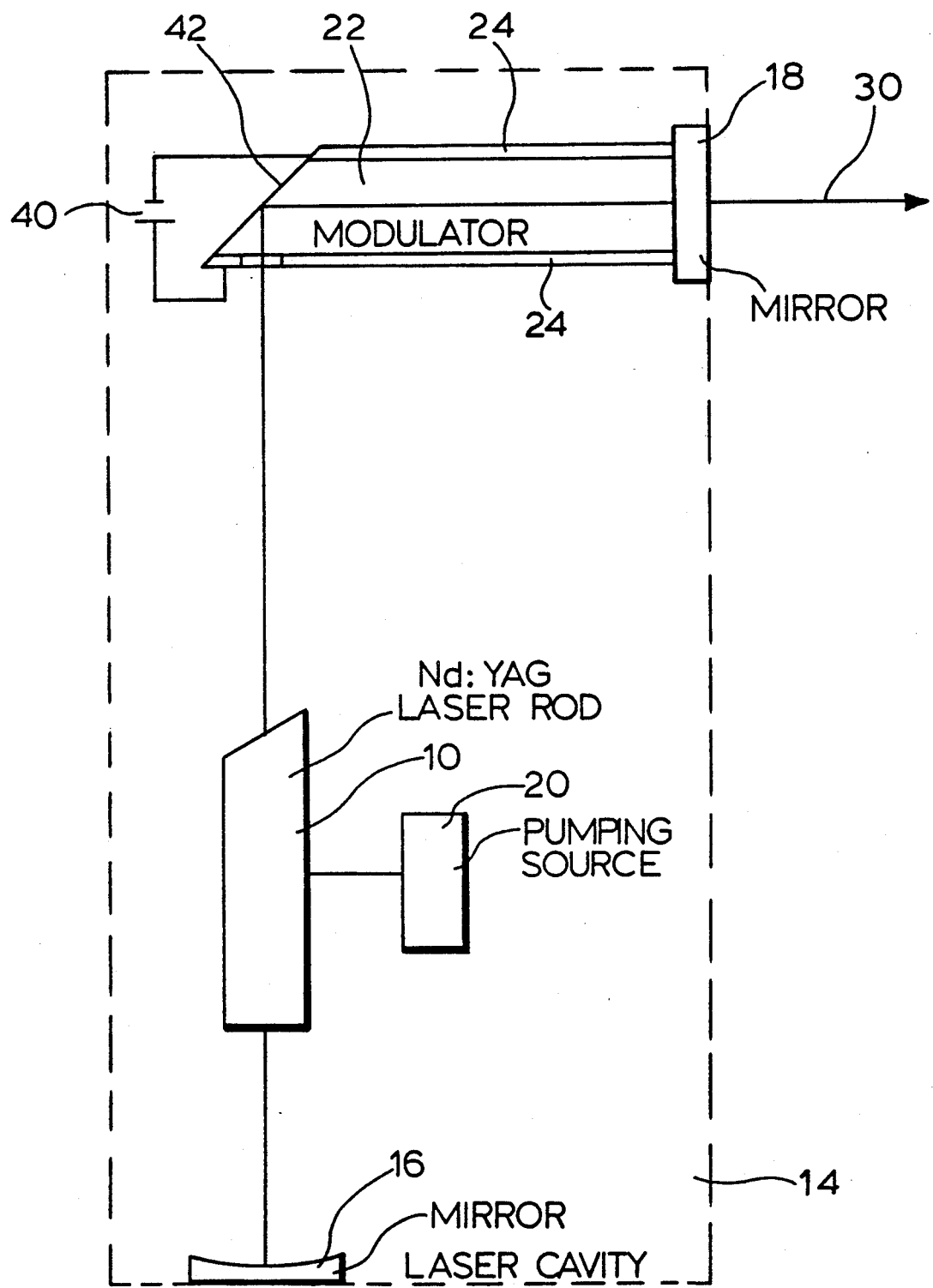
FIG. 4 illustrates a third embodiment of the system having internal feedback pulsed switching signal.

Another embodiment of the invention is shown in FIG. 4 in which a unitary configuration is provided by having all of the elements of the laser system located in the laser cavity 14. In this embodiment, the laser rod 10, pumping source 20 and mirrors 16,18 are the same as described above, although the mirrors 16,18 are oriented differently. However, in this case, a partially transmitting photodetector 38 with a control bias 40 is mounted in the path of the beam on the modulator 12. An angled mirror 42 deflects the beam 30 through the modulator 12. The photodetector 38 is connected to the waveguide 24 which is mounted on the modulator crystal 22. Thus, the beam passing through the photodetector causes the detector to produce a sharply pulsed electrical swtiching signal having spaced short pulses which is applied to the modulator 12. This compact unitary feedback system similarly produces a mode-coupled output laser beam with spaced short pulses.

While the description of the laser system and method of operation has been provided with respect to several preferred embodiments, it is not to be construed in a limiting sense. Variations and modifications will occur to those skilled in the art. For example, it will be apparent that different laser gain mediums 10, modulators 12, pumping sources 20 and detectors 26 can be used to provide a short pulsed switching signal which produces an output beam 30 having spaced short pulses. Also, these components can have a variety of sizes and be arranged in a variety of configurations. Reference is made to the appended claims for a definition of the invention.

What we claim is:

1. A laser system comprising:
   (a) an optical resonant cavity,
   (b) means including a laser gain medium, means for pumping the laser gain medium located in the cavity for producing a beam circulating in the cavity with a cavity round trip time, and laser light output means to provide a portion of said circulating beams as a laser output beam,
   (c) modulator means located in the cavity, and
   (d) pulse generator means connected to the modulator means to provide a pulsed electrical switching signal having spaced short pulses which cause mode coupling of the circulating beam to produce said laser output beam having spaced short pulses with a period equal to the round trip time of the cavity, the width of the spaced pulses of the mode-coupled output beam and the switching signal being considerably shorter than the cavity round trip time.

2. A laser system as claimed in claim 1 wherein the pulsed generator means includes light detector means connected to the modulator means, the detector means receiving a pulsed light signal to produce the pulsed electrical switching signal, having spaced short pulses.

3. A laser system as claimed in claim 2 wherein the detector means is located outside the cavity and is driven by a laser beam received from an external mode-coupled laser.

4. A laser system as claimed in claim 3 wherein the light detector means is a photodiode.

5. A laser system as claimed in claim 2 wherein beam splitter means is provided to direct a portion of the pulsed beam to drive the detector means.

6. A laser system as claimed in claim 5 wherein the modulator is supplementary driven by an external driver.

7. A laser system as claimed in claim 5, further including controlled signal delay means connected between the light detector means and the modulator means to have the pulsed electrical switching signal in phase with the pulsed output beam.

8. A laser system as claimed in claim 7 wherein the light detector means is a photodiode.

9. A laser system as claimed in claim 2 wherein the light detector means is located in the cavity to provide a unitary configuration.

10. A laser system as claimed in claim 9 wherein the light detector means is a partially transmitting photodetector mounted on the modulator means.

11. A laser system as claimed in claim 1 wherein the modulator means is an LiTaO$_3$ crystal with a travelling waveguide.

12. A laser system as claimed in claim 11 wherein the laser gain medium located in the cavity is formed of a Nd:YAG crystal.

13. A laser system as claimed in claim 1 wherein the pumping source is a continuous wave dye laser.

14. A laser system as claimed in claim 4 wherein the photodiode is formed of indium gallium arsenic phosphide.

* * * * *